| Example | Amine | Coupling Component | Shade on Polyamide Textile Materials |
|---|---|---|---|
| 69 | p-Aminobenzenesulphonamide. | 2-naphthylamine-6-sulphon-N-(beta-chloroethyl)amide. | Orange. |
| 70 | p-Nitroaniline. | 3-N:N-diethylaminobenzenesulphon-N-(beta-chloroethyl)amide. | Red. |
| 71 | 2-chloro-4-nitroaniline. | -----do----------------- | Bluish-red. |
| 72 | p-Aminobenzenesulphonamide. | -----do----------------- | Orange. |
| 73 | 3-chloro-4-aminophenylethyl sulphone. | -----do----------------- | Scarlet. |
| 74 | 2-amino-5-cyanobenzotrifluoride. | -----do----------------- | Red. |
| 75 | 2-amino-5-nitrobenzonitrile. | -----do----------------- | Reddish-violet. |
| 76 | 2-amino-5-nitrobenzotrifluoride. | -----do----------------- | Bluish-red. |
| 77 | 3-chloro-4-aminophenyl-beta-hydroxyethylsulphone. | -----do----------------- | Scarlet. |
| 78 | 2-amino-5-nitrothiazole. | -----do----------------- | Blue. |
| 79 | 4-amino-3-nitrotoluene. | 3-acetoacetylaminobenzenesulphon-N-(beta-chloroethyl)amide. | Yellow. |
| 80 | 3-aminobenzenesulphon-N-(beta-bromoethyl)methylamide. | p-Cresol. | Do. |
| 81 | 2-naphthylamine-6-sulphon-N-(beta-chloroethyl)amide. | N:N-di-(beta-hydroxyethyl)-m-toluidine. | Orange. |
| 82 | 2-aminobenzenesulphon-N-(beta-chloroethyl)amide. | N-beta-hydroxyethyl-1-naphthylamine. | Red. |
| 83 | 2-anisidine-4-sulphon-N-(beta-chloroethyl)amide. | p-Cresol. | Yellow. |
| 84 | -----do----------------- | Methyl-2-hydroxy-3-naphthoate. | Red. |
| 85 | 4-aminobenzenesulphon-N-(beta-gamma-dichloropropyl)amide. | p-Cresol. | Yellow. |
| 86 | 2-amino-4-trifluoromethyl benzenesulphon-N-(beta-chloroethyl)amide. | N-beta-hydroxyethyl-1-naphthylamine. | Bluish-red. |
| 87 | 4-aminobenzenesulphon-N-(beta-bromoethyl)amide. | p-Cresol. | Yellow. |
| 88 | 4-aminobenzenesulphon-N-(beta-chloroethyl)amide. | -----do----------------- | Do. |
| 89 | p-Aminobenzenesulphonamide. | 2-naphthol-6-sulphon-N-(beta-chloroethyl)amide. | Orange. |
| 90 | 4-chloro-2-trifluoromethyl aniline. | 2-naphthylamine-6-sulphon-N-(beta-chloroethyl)amide. | Do. |
| 91 | 2-naphthylamino-6-sulphon-N-(β-chloroethyl)amide. | N-β-hydroxyethyl-α-naphthylamine. | Red. |
| 92 | 1-naphthylamine-4-sulphon-N-(β-chloroethyl)amide. | -----do----------------- | Bordeaux. |
| 93 | 2-amino-6-methylsulphonylbenzthiazole. | N-ethyl-N-(3'-β-chloroethylaminosulphonylbenzyl)aniline. | Bluish red. |
| 94 | -----do----------------- | 3-N:N-diethylaminobenzenesulphon-N-β-chloroethylamide. | Rubine. |
| 95 | 2-amino-6-(β-chloroethylsulphamyl) benzthiazole. | N-β-hydroxyethyl-N-β'-aminocarbonylethyl-m-toluidine. | Bluish red. |
| 96 | -----do----------------- | N:N-bis(β-acetoxyethyl)aniline. | Red. |
| 97 | Benzidine. | 2-naphthylamine-6-sulphon-β-chloroethylamide (2 moles). | Do. |
| 98 | Aminoazobenzene. | 2-naphthol-6-sulphon-(γ-chloro-β-hydroxypropyl)amide. | Scarlet. |
| 99 | 3-aminobenzenesulphon-N-(γ-chloro-β-hydroxypropyl)-N-cyclohexylamide. | p-Cresol. | Yellow. |
| 100 | 3-aminobenzenesulphon-N-(γ-chloro-β-hydroxypropyl)-N-benzylamide. | N:N-di-β-hydroxyethyl-m-toluidine. | Orange. |
| 101 | 3-aminobenzenesulphon-N-(γ-chloro-β-hydroxypropyl)-N-allylamide. | N-β-hydroxyethyl-α-naphthylamine. | Red. |
| 102 | 3-aminobenzenesulphon-N-(2'-bromocyclohexyl)amide. | N:N-di-(β-hydroxyethyl)-m-toluidine. | Orange. |
| 103 | 3-aminobenzenesulphon-N-β-chloro-n-butylamide. | p-Cresol. | Yellow. |
| 104 | 4-aminobenzenesulphon-N-β-γ-dibromopropylamide. | N:N-di(β-hydroxyethyl)-m-toluidine. | Orange. |
| 105 | 4-aminobenzenesulphon-3'-chloropiperidide. | p-Cresol. | Yellow. |
| 106 | Sulphanilamide. | 1-[3'-(β-chloroethylaminosulphonylphenyl]-3-methyl-5-pyrazolone. | Do. |
| 107 | 2-amino-4-methylthiazole. | 3-N:N-diethylaminobenzenesulphon-N-β-chloroethylamide. | Orange. |
| 108 | 2-amino-5-methylsulphonylthiazole. | 1-naphthylamine-4-sulphon-N-β-chloroethylamide. | Do. |

The 2-anisidine-4-sulphon-N-(β-chloroethyl)amide used in the above examples may be obtained by treating acetyl-2-anisidine with chlorosulphonic acid and reacting the resulting acetyl-2-anisidine-4-sulphonchloride with beta-chloroethylamine in a 10% aqueous solution of acetone, the mixture being kept neutral to litmus by the addition of sodium carbonate, filtering off the acetyl 2-anisidine-4-sulphon-N-(beta-chloroethyl)amide which is formed and heating this with a 15% aqueous solution of hydrochloric acid at 80° C. The solution is then cooled and the 2-anisidine - 4 - sulphon-N-(beta-chloroethyl)amide hydrochloride which separates out is filtered off and dried.

The 2-amino-4-trifluoromethylbenzenesulphon-N-(beta-chloroethyl)amide used in the above examples may be obtained by reacting 2-nitro-4-trifluoromethylchlorobenzene with sodium disulphide, passing chlorine into an aqueous suspension of the 2:2'-dinitro-4:4'-di(trifluoromethyl)-diphenyldisulphide so obtained, reacting the 2-nitro-4-trifluoromethylbenzenesulphon chloride so obtained with beta-chloroethylamine hydrochloride in aqueous medium in the presence of Raney nickel catalyst, filtering off the 2 - nitro-4-trifluoromethylbenzenesulphon-N-(beta-chloroethyl)amide which is formed. This nitro compound is then reduced to the corresponding amino compound by hydrogenating an ethanol solution of the nitro compound in the presence of Raney nickel catalyst, filtering off the catalyst and evaporating off the ethanol from the filtrate when 2 - amino-4-trifluoromethylbenzenesulphon-N-(beta-chloroethyl)amide is obtained in the form of an oil.

The 2 - amino-5-nitrobenzenesulphon - N-(beta-chloroethyl)amide used in the above examples may be obtained as follows:

A solution of 25 parts of beta-chloroethylamine hydrochloride in 50 parts of water is added with stirring to a solution of 40 parts of 4-nitroacetanilide 2-sulphonylchloride (which is obtained by reacting 4-nitroacetanilide 2-sulphonic acid with a mixture of phosphorus oxychloride and phosphorus pentachloride) in a mixture of 160 parts of acetone and 40 parts of water, which has been cooled to a temperature of 10° C. 170 parts of a 2 N aqueous solution of sodium carbonate are then added during 1 hour and the mixture stirred for a further 20 hours, during which time the acetone evaporates off. The precipitated 2-acetylamino-5-nitro-benzenesulphon-N-(beta-chloroethyl)amide is then filtered off, washed with water and dried. A mixture of 20 parts of this compound, 38 parts of water, 50 parts of acetone and 27 parts of a 36% aqueous solution of hydrochloric acid is stirred at the boil under a reflux condenser for 8 hours. The solution is then cooled to 20° C. and the yellow crystalline solid filtered off, washed with water and dried. The product has a melting point of 125° C.

The 2 - naphthol-6-sulphon-N-(beta-chloroethyl)amide used in the above examples may be obtained as follows:

A mixture of 23 parts of 2-hydroxy-1-naphthoic acid 6-sulphon-N-(beta-chloroethyl)amide (which is obtained by reacting 2-hydroxy-1-naphthoic acid 6-sulphonchloride with beta-chloroethylamine in water in the presence of